Sept. 19, 1950     L. E. VALCOURT     2,522,650
CLASP OR CONNECTOR FOR WATCH-BRACELETS AND THE LIKE
Filed Feb. 5, 1949

Inventor:
Louis E. Valcourt
By
Attorneys.

Patented Sept. 19, 1950

2,522,650

UNITED STATES PATENT OFFICE 2,522,650

CLASP OR CONNECTOR FOR WATCH-BRACELETS AND THE LIKE

Louis Edmond Valcourt, East Providence, R. I., assignor to Kestenman Bros. Mfg. Co., Providence, R. I., a corporation of Rhode Island Application February 5, 1949, Serial No. 74,803

6 Claims. (Cl. 24—241)

This invention relates to improvements in clasps, connectors or fastening devices for attaching the ends of bracelets to wrist-watches and connecting various types of linkages or the like to other articles of jewelry.

One object of the invention is to provide a clasp or connector for the ends of a watch-strap or bracelet adapted to engage through a loop or bail on the watch-case, or in some cases through an intermediary connecting member attached to the watch, to provide a secure connection of the bracelet to the watch or other article.

Another object is to provide a device of the type indicated in which the clasp or connector is held securely in connection with the watch or other article and protected by a safety device to prevent unwarranted or accidental release of the clasp therefrom.

Another object is to provide a device of the type indicated comprising a main ornamental member carrying three hinged elements, one of which is in the form of a hook for engaging through the loop on a watch-case; another element constituted as a keeper for locking the hook in closed relationship; and the third member a finger-operable lever for moving the keeper into locking engagement with abutments on the main member to prevent its unwarranted displacement and consequent release of the hook from the loop on the watch-case.

Another object is to provide a device of the type indicated in which the hook is locked by the keeper against release from the loop on the watch-case to resist any pressure exerted on the hook.

Another object is to provide a device of the type indicated in which the keeper is held in engagement with an abutment or abutments on the main member until the operating lever is swung back to a considerable extent so as to insure against accidental release of the clasp from the loop on the watch-case.

Another object is to provide a clasp or connector of compact construction, neat and ornamental in appearance and having its mechanical elements enclosed and concealed from view when the bracelet is attached to a watch and worn on the wrist.

Another object is to provide a clasp or connector of the type indicated having its parts constructed from sheet-metal, stamped out and struck up to shape to adapt it for economical cost of manufacture.

Further objects of the invention are set forth in the following specification which describes a preferred form of construction of the clasp, by way of example, as illustrated by the accompanying drawing. In the drawing.

Figure 7:
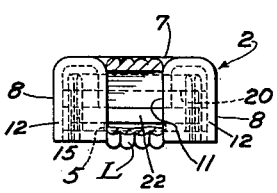
Figure 8:
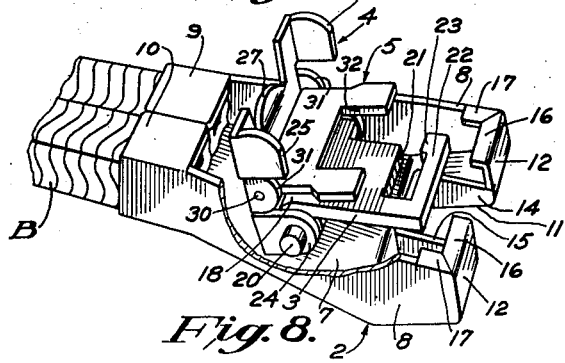

Fig. 7 is an end view of the clasp looking toward its forward end and representing the loop on the watch as partly broken away; and Fig. 8 is a greatly enlarged perspective view, showing the clasp in inverted position or bottom side up and illustrating the hook-member, the locking member or keeper, and the operating lever as in inoperative relationship or open prior to attaching the clasp to the watch-case.

Wrist-watches are provided with various types of attaching means at the sides of their cases. Men's watches, for example, usually have a pair of lugs at each side of the case with holes therein for receiving the spring-pressed points or tips of cross-pins held in tubular fittings fastened to the ends of the bracelet. Ladies' watches, however, generally have a different form of attaching means such as a loop at each end of the watch-case for engagement therethrough of a link or ring at each end of the bracelet. The present improved catch or connector is particularly adapted for use with ladies' watches having the last-described type of attaching means on the watch-case; but in other cases the present clasp may be used with men's watches by employing a secondary or intermediary loop-element connected to the lugs on the case or carried by the cross-pin engaged with the lugs.

In general, the present improved clasp or connector comprises a hollow enclosing member 2 for permanent connection to the end of a strap, linkage or bracelet B and having a hook-shaped element 3 hingedly mounted therein with its hook adapted to engage through the loop L on the watch-case W. In the present improved device the hook-member 3 is hinged on the same pivot with an operating lever 4, whereby both elements may be rocked into the main member 2 or swung downwardly in open relation thereto. The device also comprises a third locking element or keeper 5 constituting the safety means for retaining the hook-member 3 from being opened away from the main member 2. The keeper 5 is pivoted to the operating lever 4 to cause it to be rocked into position against the bottom of the hook-member 3 and simultaneously slid forward to engage its end under abutments at the forward end of the main member 2 to lock the hook thereto; all as more specifically described hereinafter.

Figure 1:
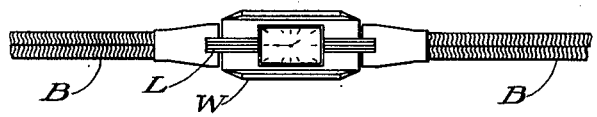
Fig. 1 is a top plan view of a wrist-watch showing the ends of a bracelet attached thereto by means of the present improved clasp or connector.
Figure 2:
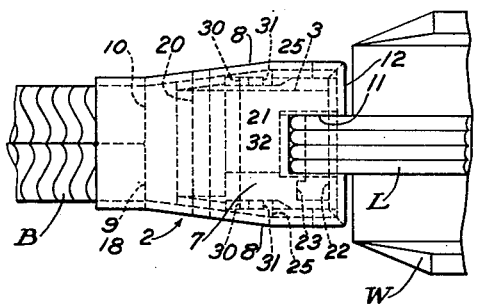
Fig. 2 is a greatly enlarged top plan view of the clasp shown as attached to one of the loops on a watch-case, illustrated fragmentarily.
Figure 3:
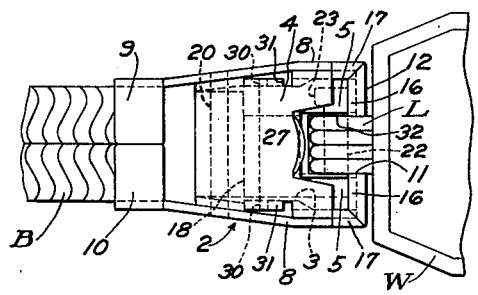
Fig. 3 is a similarly enlarged bottom plan view of the same.

Referring to the drawing, the main enclosing member 2 of the clasp may be constructed of sheet-metal in hollow form with a top wall 7 and depending side walls 8, the rearward portions of which are folded inwardly at 9 and 10 with their edges abutting as shown in Fig. 8 to enclose the end of the strap or bracelet B for attachment thereto. This end of the main member 2 may be soldered or otherwise fastened around the end of the bracelet B in any suitable manner. The main member 2 is preferably of substantially wedge-shape in plan view as shown in Fig. 2 with its side walls 8 inclined outwardly toward its forward end and its front portion bifurcated to provide a slot or opening 11 for receiving the loop L on the side of a watch-case W. The two lateral bifurcated portions of the member 2 at its forward end are formed with the side walls 8 extended inwardly toward each other to provide front walls 12 continued in a rectangular loop-shaped wall 14 surrounding the three sides of the opening 11; the lower edges 15 of these walls providing a seat or rest for the hook-member 3 when in closed position as later explained.

Figure 4:
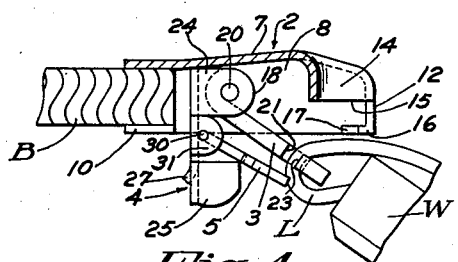
Fig. 4 is an enlarged side view of the clasp shown partly in section in a vertical plane and illustrating the hook-member of the device as initially engaged with a loop on the side of the watch-case.

Folded inwardly from the front walls 12 and the forward portions of the side walls 8 are lip-like flanges 16 and 17, see Figs. 4 and 8, which form detent-abutments at the front end of the member 2 for engagement respectively with the forward end of the keeper 5 and the forward end of the operating lever 4 when these elements are in closed position within the main member.

The hook-member 3 is of relatively flat plate-like form with its rearward portion curled around to provide a tubular bearing 18 for hingedly mounting it on a transverse pivot-pin 20 riveted through the side walls 8 of the main member 2. The forward portion of the hook-member 3 is slotted transversely to provide an opening 21 for receiving the end of the loop L on the watch-case W and the beak-like portion 22 of the hook is preferably formed with a shouldered abutment 23 at its end for overlying the side of the loop to hold it from lateral movement in the hook. It will be understood that the hook-member 3 is adapted to rock downwardly from the bottom of the main member 2 as shown in Fig. 4 for engaging its hook with the loop L on the watch W and to be thereafter rocked or folded upwardly into the hollow of the member 2 to seat against the bottom edges 15 of the wall 14 which surrounds the opening in the front of the main member.

The operating lever 4 may be constructed of sheet-metal and formed with ears 24 pivoted on the pin 20 abutting the ends of the cylindrical bearing 18 of the hook-member 3. The main portion of the operating lever 4 is substantially flat with its end of bifurcated form. The two bifurcations at the sides of the operating lever 4 are formed with extensions folded at right-angles to the plane of the lever to provide ears 25 employed as latching means for retaining the lever in closed position on the under side of the main member 2. The forward edges of the ears 25 are of arcuate contour or cam-shaped to adapt them to slide across the edges of the lips 17 at the front of the main member 2 to frictionally engage therewith and retain the lever 4 latched on the under side of the main member. Between the bifurcations of the lever 4 the metal in the opening is formed with an arcuately-shaped edge and bent out of the plane of the lever to form a lip 27 under which the fingernail may be inserted for rocking or swinging the lever 4 downwardly to release its ears 25 from engagement with the edges of the flanges 17 on the under side of the member 2.

The locking member or keeper 5 is likewise constructed of sheet-metal in the form of a substantially flat plate provided with laterally-projecting pintles 30 at its rearward end which are received in holes or perforations in a pair of ears 31 projecting forwardly from the sides of the lever 4 whereof to pivotally mount the keeper thereon. The forward portion of the keeper 5 is cut away to form an opening 32 corresponding in length to the opening 21 in the hook-member 3, the bifurcations at the sides of the opening being adapted to seat against the bottom of the hook-member 3 with one of its bifurcations closing the entrance to the opening in the hook. Through this connection between the keeper 5 and operating lever 4, when the latter is closed into the bottom of the hollow member 2 the keeper will lie flat against the hook-member 3 and be slid forwardly by the closing movement of the lever 4 to cause the ends of its bifurcations to slide in under the flanges 16 which thus form abutments to hold the keeper in closed relationship and the hook-member locked in place thereby.

The method of operation of the complete device is as next explained.

Figure 5:
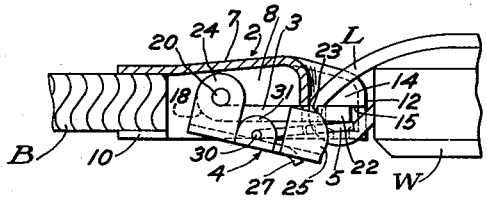
Fig. 5 is a similar part-sectional view showing the hook-member of the clasp engaged with the loop on the watch-case and carried into closed relationship with the operating lever partly closed into the main element of the clasp.
Figure 6:
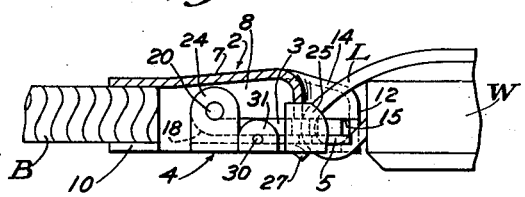
Fig. 6 is a similar part-sectional view showing the clasp with the hook engaged with the loop on the watch-case and the operating lever completely closed to lock the keeper in engagement with the abutments on the main member.

To fasten the bracelet B to the side of the watch W the clasp is first opened with its parts assuming the relationship shown in Fig. 4, whereafter the beak of the hook-member 3 is engaged through the loop L on the watch-case. The clasp may then be manipulated relatively to the watch to insert the end of the loop L within the opening 11 at its forward end, thereby causing the hook-member 3 to close flat against the edges 15 of the wall 14 surrounding the opening. The finger-lever 4 may now be swung upwardly to rock the keeper 5 in the same direction to cause it to underlie the hook-member 3 as shown in Fig. 5, thereby forcing the finger lever into the opening on the underside of the member 2 and engaging the cam-shaped edges of its ears 25 across the edges of the flanges or abutments 17 at the forward end of the main member. In this way the operating lever 4 is latched securely to the main member 2 and as the lever is closed into this relationship it will slide the keeper 5 forwardly to engage the forward ends of its lateral bifurcations with the abutments or flanges 16 to lock the hook-member 3 in closed relationship. Stated another way, the upward swinging movement of the lever 4 will carry the keeper 5 into position flat against the underside of the hook-member 3, as shown in Fig. 6, and slide it forwardly to engage it with the upper faces of the flanges to secure the hook-member against release until the lever 4 is swung downwardly again. With the clasp thus engaged with the loop L on the watch W any pressure tending to swing the hook-member 3 downwardly will be resisted by the engagement of the keeper 5 therewith while the latter is interlocked with the flanges 16 on the main member 2.

If it is required to disconnect the bracelet from the watch-case the clasp may be opened by simply placing the fingernail under the lip 27 and swinging the lever 4 downwardly to disengage the edges of its ears 25 from the edges of the flanges 17 on the under side of the main member 2. During this operation the keeper 5 will be withdrawn to disengage its forward end from the flanges 16 and thereby release the hook-member 3 for detaching it from the loop L on the watch W.

It will be observed from the foregoing that the present invention provides a novel and ingenious construction in a clasp or other connector for use in attaching watch-straps, bracelets or the like to watches or other articles. The parts of the clasp may be constructed from sheet-metal struck up in dies to render them economical to manufacture and convenient for assembly. As an important feature of the improvement the hook for engaging the clasp with the loop on a watch or other article is provided with a safety means to lock it against unwarranted release under stresses, thus providing against accidental disconnection of the bracelet from the watch.

While the clasp is herein shown as embodied in a preferred form of construction, it is to be understood that various modifications may be made in the arrangement of the parts of the device without departing from the spirit or scope of the invention as expressed in the following claims. Therefore, without limiting myself in this respect, I claim:

1. A clasp or connector for attaching straps, bracelets and the like to wrist-watches or other articles comprising a hollow main member open on its under side, a hook-member pivoted within the main member and adapted to be engaged through a loop on the watch-case, a lever pivoted within the main member to close against the under side thereof, a keeper pivoted to said lever and movable thereby to engage said keeper against the hook-member, said keeper being engageable with detent-abutments on the main member to lock the hook-member in closed position and prevent said hook-member from opening until the lever is swung away from the main member.

2. A clasp or connector for attaching straps, bracelets or the like to wrist-watches comprising a hollow main member open on its underside, a hook-member pivoted to the main member and formed with a beak for insertion through a loop on the watch-case, a finger-lever pivoted to the main member and having latching means for holding said finger-lever in closed relation on the under side of said main member, a keeper pivoted to the finger-lever to adapt said keeper to be moved into the main member to engage against the hook-member, and abutments at the forward end of the main member, said abutments being interengageable with the keeper when the latter is carried into the main member and slid forwardly on the under side of the hook-member.

3. A clasp or connector for attaching straps, bracelets or the like to wrist-watches comprising a main member of hollow form open on its under side and provided with an opening at its forward end adapted to receive the loop on the watch-case, a hook-member pivoted within the main member to rock upwardly thereinto and shaped to engage through a loop on the watch-case, a finger-lever pivoted within the sides of the main member, a keeper pivoted to said finger-lever to adapt said keeper to be closed into the hollow member against the hook-member, and abutments at the forward end of the main member adapted to interlock with the end of the keeper when the latter is slid forwardly by closing the lever against the bottom of the main member, said lever having means for latching it in closed position on the under side of the main member.

4. In a clasp or connector for attaching the end of a bracelet to a wrist-watch or other article comprising a hollow member having a top with depending walls formed with inturned flanges at its forward end, a connecting member pivoted within the main member and provided with means engageable through a loop on the watch-case, a lever pivoted to the main member and provided with means for latching said lever across the inturned flanges thereon, and a keeper pivoted to said lever to adapt said keeper to fold against the connecting member when the latter is engaged with the loop on the watch-case and thereafter move into engagement with the flanges on the main member to lock said keeper in place on said main member.

5. A clasp or connector for attaching straps, bracelets or the like to wrist-watches comprising a hollow member having a top wall with depending side walls and an opening at its forward end for receiving a loop on the watch-case, a connecting member on the main member adapted to engage through the loop on the watch-case, an operating lever having means for latching said lever to the main member, and a keeper movably connected to the lever to adapt said keeper to be carried against the connecting member and engaged with detent means on the main member to look the connecting member against release.

6. A clasp or connector for attaching straps, bracelets and the like to wrist-watches comprising a main hollow member having a top wall with depending side walls and an opening at its forward end for receiving the loop on the side of a watch-case, the edges of the walls enclosing the opening at the forward end of the main member forming a seat therein and the front walls of the main member being provided with inwardly-projecting detent-flanges, a hook-member pivoted to the main member with its forward end adapted to hook through the loop on the watch-case and fold into the main member against said rest, a lever pivoted to the main member and provided with means for latching said lever in closed position on said main member, and a keeper pivoted to the lever to adapt said keeper to close against the hook-member and be moved by the lever to engage the ends of said keeper with the detent-flanges on the main member to lock the hook-member against swinging away from the main member.

LOUIS EDMOND VALCOURT.

REFERENCES CITED

The following references are of record in the file of this patent:

UNITED STATES PATENTS

| Number | Name | Date |
| --- | --- | --- |
| 1,559,653 | Stucker | Nov. 3, 1925 |
| 2,148,534 | Cohan | Feb. 28, 1939 |
| 2,211,018 | Levine | Aug. 13, 1940 |